United States Patent [19]

Chown et al.

[11] 4,382,681
[45] May 10, 1983

[54] MEASUREMENT OF ROTATION RATE USING SAGNAC EFFECT

[75] Inventors: Martin Chown, Harlow; Jeffrey G. Farrington, Bishop's Stortford, both of England

[73] Assignee: International Standard Electric Corporation, New York, N.Y.

[21] Appl. No.: 221,249

[22] Filed: Dec. 30, 1980

[30] Foreign Application Priority Data

Jan. 17, 1980 [GB] United Kingdom ................. 8001513

[51] Int. Cl.³ .............................................. G01C 19/64
[52] U.S. Cl. ................................................. 356/350
[58] Field of Search ........................................ 356/350

[56] References Cited

U.S. PATENT DOCUMENTS 4,208,128 6/1980 Thompson et al. ................. 356/350
4,280,766 7/1981 Goss et al. .......................... 356/350

OTHER PUBLICATIONS

"Techniques for Shot Noise Limited Inertial Rotation Measurement Using a Multiturn Fiber Sagnac Interferometer", Davis et al., SPIE vol. 157 Laser Inertial Rotation Sensors (1978) pp. 131–136.

Primary Examiner—Vincent P. McGraw
Attorney, Agent, or Firm—John T. O'Halloran; Peter R. Ruzek

[57] ABSTRACT

In a Sagnac effect optical fibre gyroscope a commutating switch (SW) is included immediately before the Sagnac coil (C). Operation of the switch synthesises turning the coil upside down. This provides the advantages of producing an a.c. signal in response to a constant rotation rate and in certain arrangements remove a source of systematic error occasioned by drift in optical parameters of unbalanced components.

5 Claims, 10 Drawing Figures

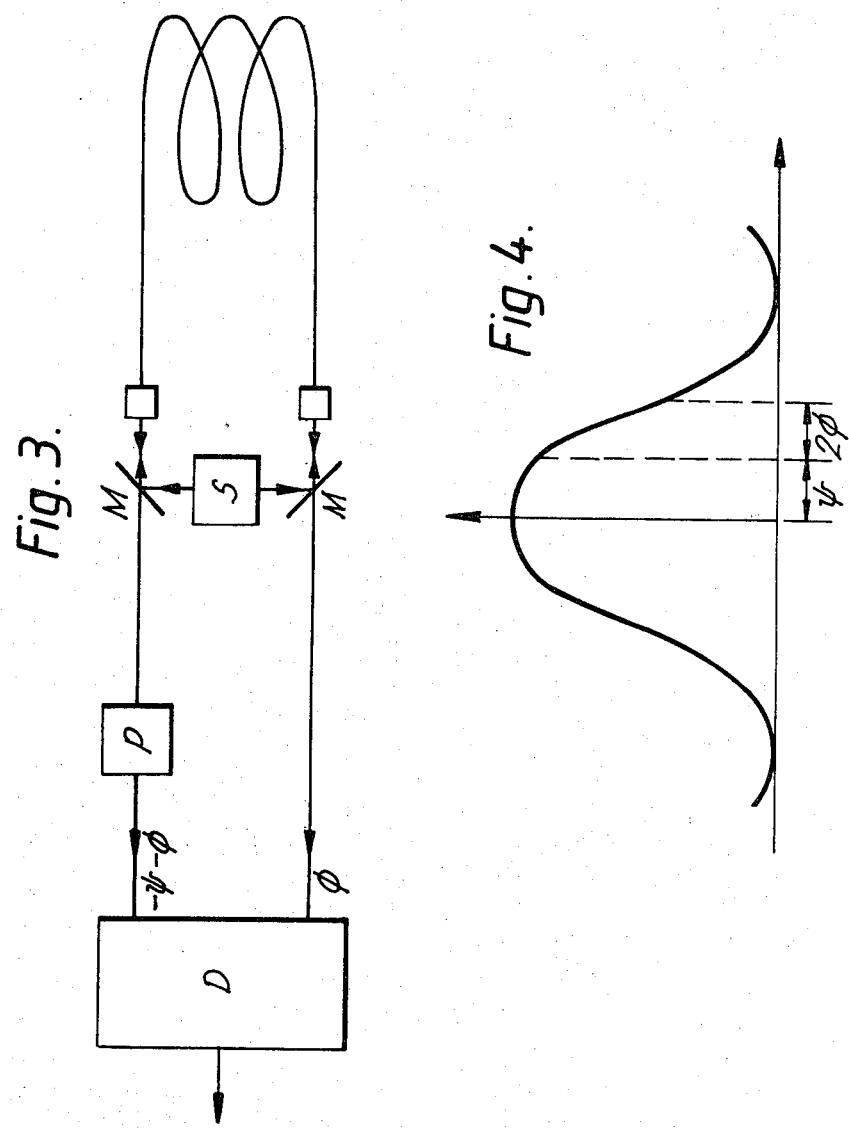

MEASUREMENT OF ROTATION RATE USING SAGNAC EFFECT

This invention relates to the measurement of rate of rotation and in particular to Sagnac effect gyros rotation rate measuring instruments whose sensing elements are provided by optical fibre coils.

According to the present invention there is provided an optical fibre coil Sagnac effect rotation rate measuring instrument which has either a single optical fibre Sagnac coil, consisting of a plurality of turns of single mode fibre, or a matched pair of such coils arranged to have a common axial direction, wherein the instrument is provided with two optical ports for connection with said coil or pair of coils and is connected thereto via a commutating switch, operation of which, in the case of single coil interferometer, reverses the interconnections of the coil ends with the two ports, and, in the case of the pair of coils, changes the interconnection of the ports from one coil to the other in such a way that light previously launched into the one coil to propagate in either one of the two rotational senses is now launched to propagate in the opposite rotational sense in the other coil.

Gyros embodying the invention in preferred forms will now be described, but this description will be prefaced with an explanation of the background of the invention. The description and explanation make reference to the accompanying drawings in which:

FIG. 3 depicts a modified form of the arrangement of FIG. 1.

FIG. 4 depicts the output characteristic of the photo detector of the arrangement of FIG. 3.

The underlying principle of a Sagnac effect gyro (rotation rate measuring instrument) is the utilisation of the effect that light propagating in a loop sees an increase in optical path distance around that loop when the loop is rotated in the same sense as the direction of light propagation, and a shortening of optical path distance when the senses are opposite. This loop is conveniently provided by a single mode optical fibre, typically in the region of 10 Km long, which is wound into a coil. In the case of such a coil the path difference is given by $$\Delta L = 2\Omega RL/c$$

where
  $\Omega$ is the angular rotation rate of the coil
  L is the length of the fibre
  c is the speed of light in free space, and
  R is the radius of the coil.

The optical path distance increment, $\Delta L$, can be measured by reference to the phase of light emerging from the coil. For this purpose liht from a source is directed through the coil and interfered at a photodetector with light from the same source directed through a different path. In order to balance out extraneous effects liable to give rise to spurious phase change measurements it is desirable to make the optical paths of the two interfering beams as similar as possible. For many applications this is conveniently provided by directing the light in both directions through the coil, and interfering the two emergent beams.

Figure 1:
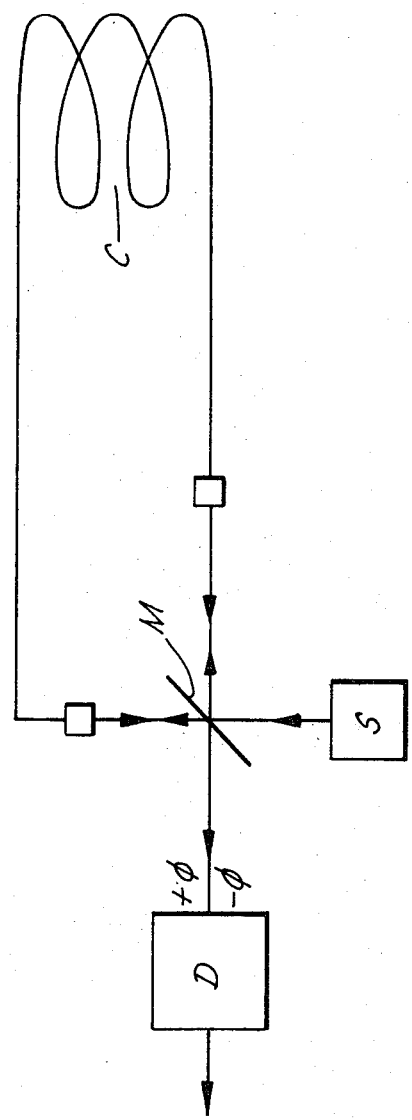
FIG. 1 depicts an arrangement for detecting the Sagnac effect in an optical fibre coil.

In principle the arrangement can be as depicted in FIG. 1 in which light from a laser source S is directed via a beam splitting mirror M to both ends of an optical fibre 'Sagnac' coil C. Light returning from the coil C is recombined by the mirror M to provide an interference signal input to a photodetector D1. If the coil is rotating, the phase of one of the recombining beams is advanced by an angle $\phi$, while that of the other is retarded by the same amount.

Figure 2:
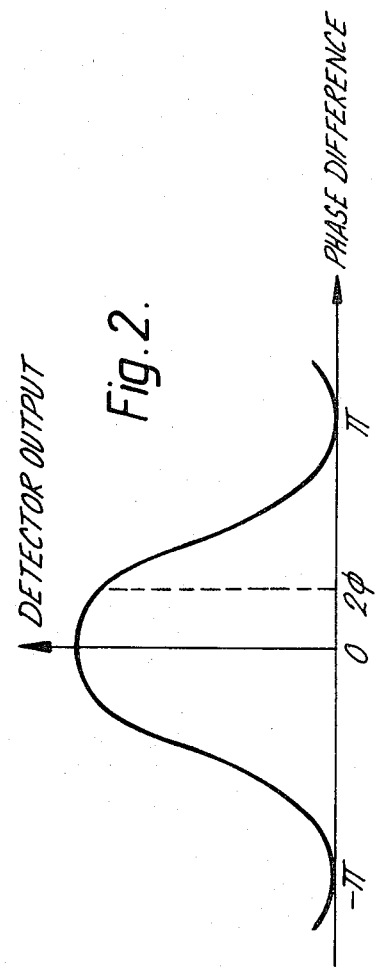
FIG. 2 depicts the output characteristic of the photo detector of the arrangement of FIG. 1.

FIG. 2 depicts the detector output characteristic, showing the way the output of the detector D varies with phase angle $\phi$. This shows that the arrangement of FIG. 1 has too great a symmetry in that the output will not distinguish between the two senses of rotation. Moreover the arrangement will have very poor sensitivity to small rotation rates because the gradient of the characteristic is extremely small for small values of phase angle $\phi$.

This problem may be overcome, as shown schematically in FIG. 3, by separating the two optical paths and making them of slightly different length so that when the two beams are recombined to produce an interference signal input to photo detector D they are separated by a fixed phase angle $\psi$ in the absence of any rotation of the coil. In FIG. 3 this difference in optical path distance is represented by a lumped element P providing the requisite phase delay $\psi$. The corresponding detector output characteristic is depicted in FIG. 4. An appropriate choice of magnitude for the fixed phase angle $\psi$ is one substantially different from 0 and from $\pi$ which will provide a working point on a steep part of the characteristic. This will not only improve sensitivity, but will also distinguish between rotation rates of opposite sence. The penalty for these advantages is that any drift in the fixed phase angle $\psi$ will result in a direct error in the measurement of $\phi$. Since $\psi$ is liable to be many orders of magnitude greater than $\phi$ this imposes extremely close tolerance requirements upon the optical components that determines the value of $\psi$.

Figure 5:
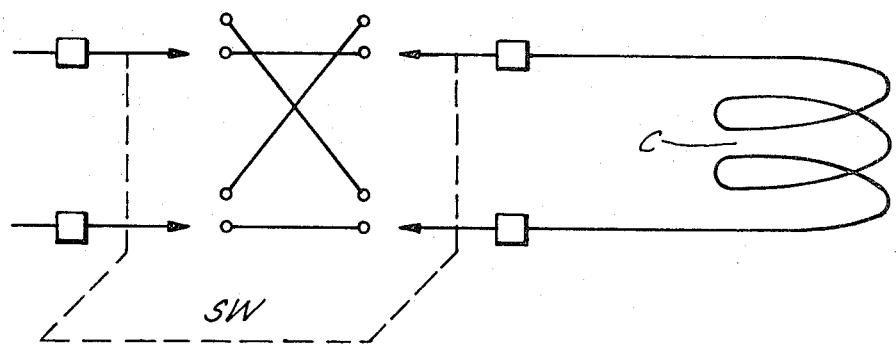
FIGS. 5 and 6 depicts alternative forms of commutative switching for Sagnac coils.
Figure 6:
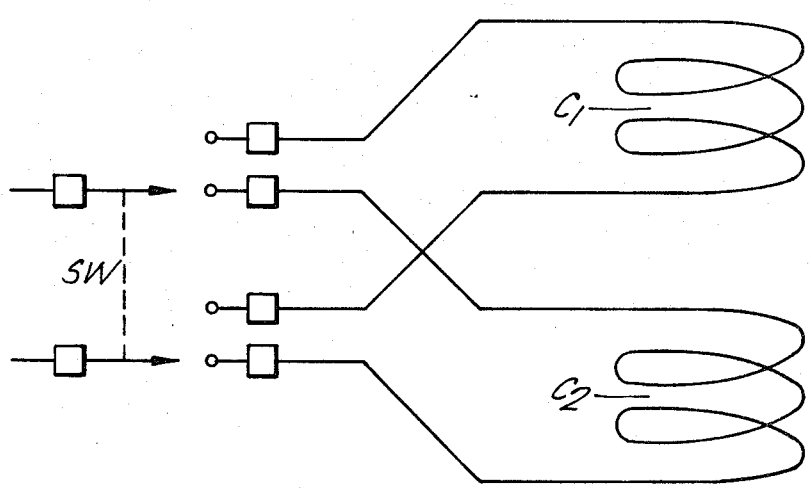

The problem referred to above associated with the FIG. 3 arrangement is that of drift, and there is also the associated problem that a constant rotation rate produces a d.c. signal, with its attendant problems of low frequency noise. These problems could be overcome by periodically turning the Sagnac coil upside down. This would have the effect of periodically reversing the phase of the Sagnac signal, and thus an a.c. signal would be produced. Physical turning over the coil would be inconvenient in practice, but the effect is synthesised by the use of optical switches. FIGS. 5 and 6 depict alternative arrangements, with the switch SW depicted schematically as a relay. The switch can be realised in a number of different ways, for example by optical fibre mechanical relay switches, by Bragg cell switching, or by electro-optic integrated optics switching. In the arrangement of FIG. 5 the switching is of a cross-over type, whereas in the arrangement of FIG. 6 separate identical coils $C_1$ and $C_2$ are used thereby reducing the number of switching elements required.

Figure 7:
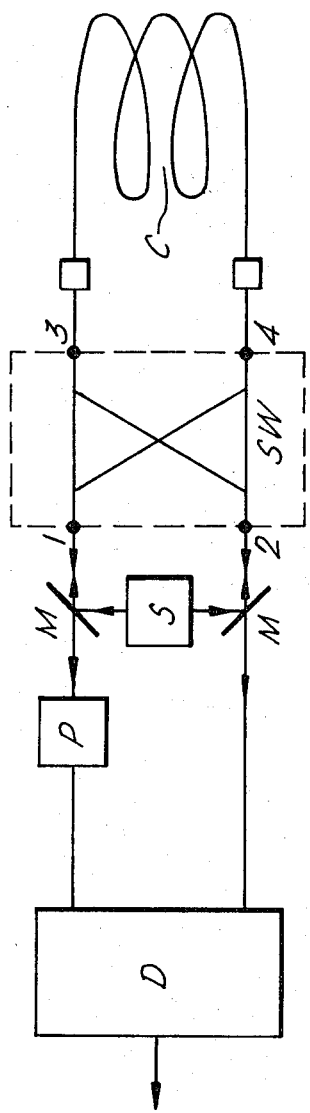
FIG. 7 depicts an instrument for measuring rotation rate by means of the Sagnac effect.
Figure 8:
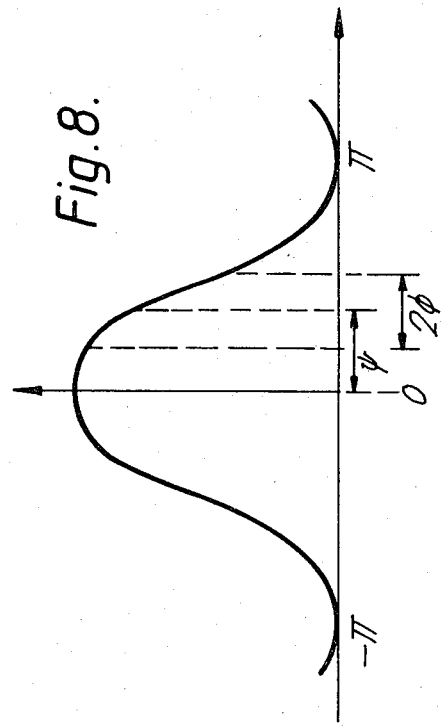
FIG. 8 depicts the output characteristic of the photodetector of the instrument of FIG. 7, and FIGS. 9 and 10 depict two further instruments for measuring rotation rate by means of the Sagnac effect.

FIG. 7 shows the arrangement of FIG. 3 modified by the inclusion of a commutating (changeover) switch CSW between the source S and the Sagnac coil C. In condition A of the commutating switch port 1 is connected to port 3, while port 2 is connected to port 4. In condition B port 1 is connected to port 4, while port 2 is connected to port 3. FIG. 8 depicts the corresponding output characteristic of the photodetector D. From this it can be seen that a rotation rate providing a phase shift of $\phi$ produces an a.c. signal and that its magnitude is unaffected by small variations in the absolute magnitude of the fixed phase delay $\psi$ provided that these are small enough for the slope of the characteristic at the working point to be unchanged.

To the right of the beam splitting mirrors M the optical path distance from mirror to mirror is the same for both directions of launch when the switch is in condition A. Similarly it is the same for both directions of launch when the switch is in condition B. But it is to be noted that the total optical path with the switch in condition A is not in general going to be the same as that with the switch in condition B.

For zero rotation rate the phase difference at the detector is therefore independent of the optical path distance from mirror to mirror. However it is necessary for light launched into the coil while the switch is in either condition to emerge from the coil and return through the switch while it is again in the same condition. Therefore the switching frequency is chosen to be equal to, or a multiple of, the reciprocal of the propagation time of light through the Sagnac coil. It will also be evident that, since the switch will normally have switched a number of times during the transit of a pulse of light through the coil, the optical path distance through the switch itself needs to be very accurately repeatable between switching cycles.

Figure 9:
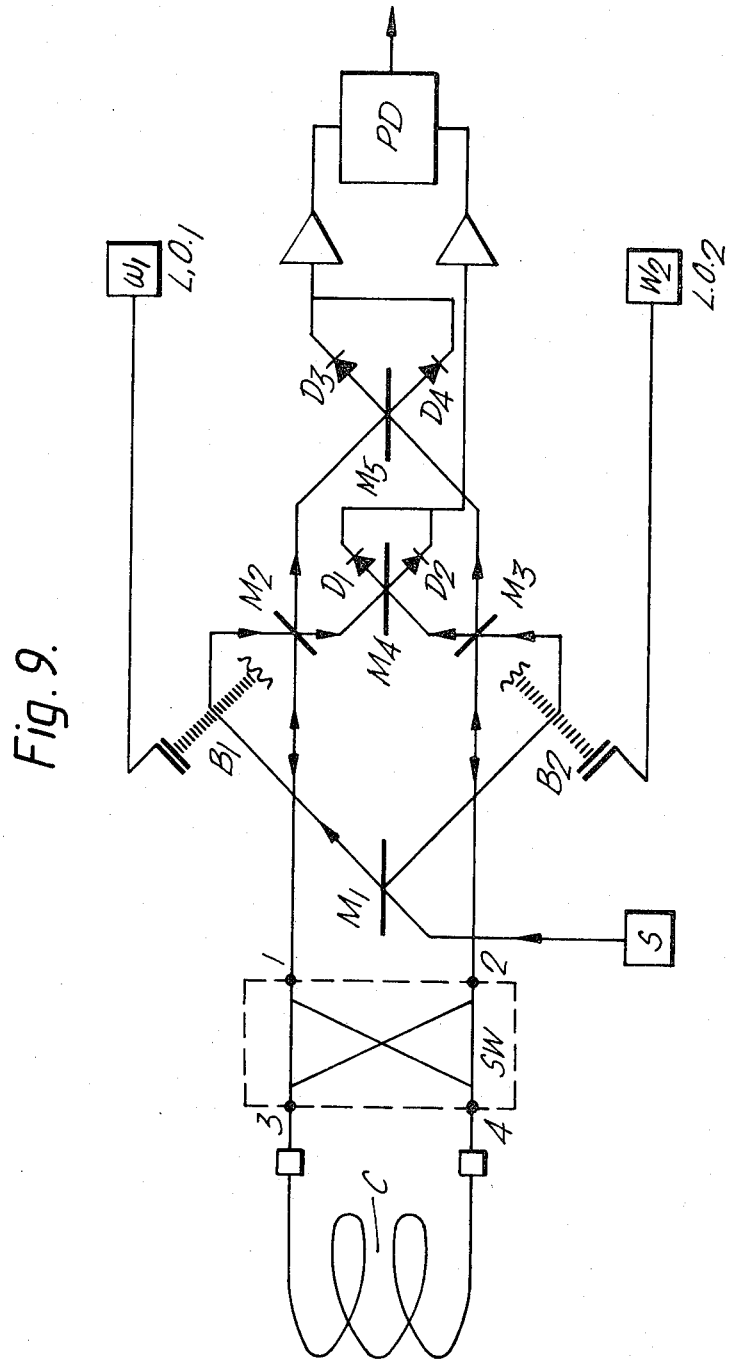

An alternative approach to the measurement of the phase difference of the optical frequency signals is to heterodyne them and detect the difference components with photo-diodes. This gives two electrical signals at an intermediate frequency whose phase difference will mimic any changes in phase difference between the optical frequency signals. An example of such an approach incorporating the commutative switching of the present invention is illustrated in FIG. 9. The heterodyne operation is achieved using a pair of Bragg elasto-optic frequency shifting cells. In such a cell an electrical signal of frequency $\omega_1$ is applied to the cell to set up a strain pattern of this frequency. This strain pattern is arranged to interact with light of frequency $\omega_0$ propagating through the cell to produce a frequency shifted optical output of frequency $\omega_0 + \omega_1$. Two such cells are employed to give frequency shifts, typically of a few tens of megahertz which differ in frequency by typically a few tens of kilohertz.

Referring now to FIG. 9 light of frequency $\omega_0$ from a laser source S is split into two beams by a beam splitting mirror $M_1$. The two beams are directed through a pair of Bragg cells $B_1$ and $B_2$ driven by local oscillators $LO_1$ and $LO_2$ operating respectively at frequencies $\omega_1$ and $\omega_2$. The two frequency shifted beams respectively of frequency $\omega_0 + \omega_1$ and $\omega_0 + \omega_2$ emerging from the Bragg cells are then directed on to a pair of beam splitting mirrors $M_2$ and $M_3$ so that a component of each beam is directed on to a further beam splitting mirror $M_4$ which serves to interfere the two components which are then detected by a pair of photodetectors $D_1$ and $D_2$ to produce a first electrical output signal at the intermediate frequency of $\omega_1 \sim \omega_2$.

The other two components of the phase shifted beam are directed from the mirrors $M_2$ and $M_3$ to pass through a commutating switch SW and into opposite ends of a Sagnac coil C. The emergent beams, after returning through the commutating switch, are then interfered by beam splitting mirror $M_5$, and the resulting two beams are detected by a pair of photodetectors $D_3$ and $D_4$ to produce a second electrical output signal at the intermediate frequency of $\omega_1 \sim \omega_2$. The two intermediate frequency signals are fed via amplifiers to a phase detector PD.

Provided that the relative phase of the two local oscillators remains constant, the phase of the first intermediate frequency signal is an arbitary constant value depending upon that relative phase and upon the difference in optical path distance of the two beams travelling from $M_1$ to $M_4$. Similarly, in the absence of any rotation, provided that the relative phase of the two local oscillators remains constant, the phase of the second intermediate frequency is an arbitary constant value which in general will differ from that of the first intermediate frequency signal. It is to be noted that both beams contributing to the second intermediate frequency signal pass through the commutating switch. Hence any difference in optical path difference introduced by changing the switch, which is identical in construction to that of the FIG. 7 instrument, from condition A to condition B does not introduce any change in the phase of the second intermediate frequency signal.

If the coil is then rotated about its axis the effective difference in optical path distance between the two beams contributing to the second intermediate frequency signal changes. This changes the phase of that signal and hence the output of the phase detector. When the commutating switch changes from condition A to condition B the change in phase is reversed, and thus an a.c. output is provided in response to a constant rate of rotation. The phase of this output relative to the communication switching determines the sense of rotation. As with the instrument of FIG. 7, the switching frequency is chosen to be equal to, or a multiple of, the reciprocal of the propagation time of light through the Sagnac coil. This ensures that light launched into the coil when the switch is in either condition emerges from the coil to return through the switch when once again the switch is in the same condition. It should be apparent that while FIG. 9 illustrates a single coil and switch construction corresponding to the FIG. 5 arrangement, the two coil and switch arrangement of FIG. 6 can be substituted for this.

Figure 10:
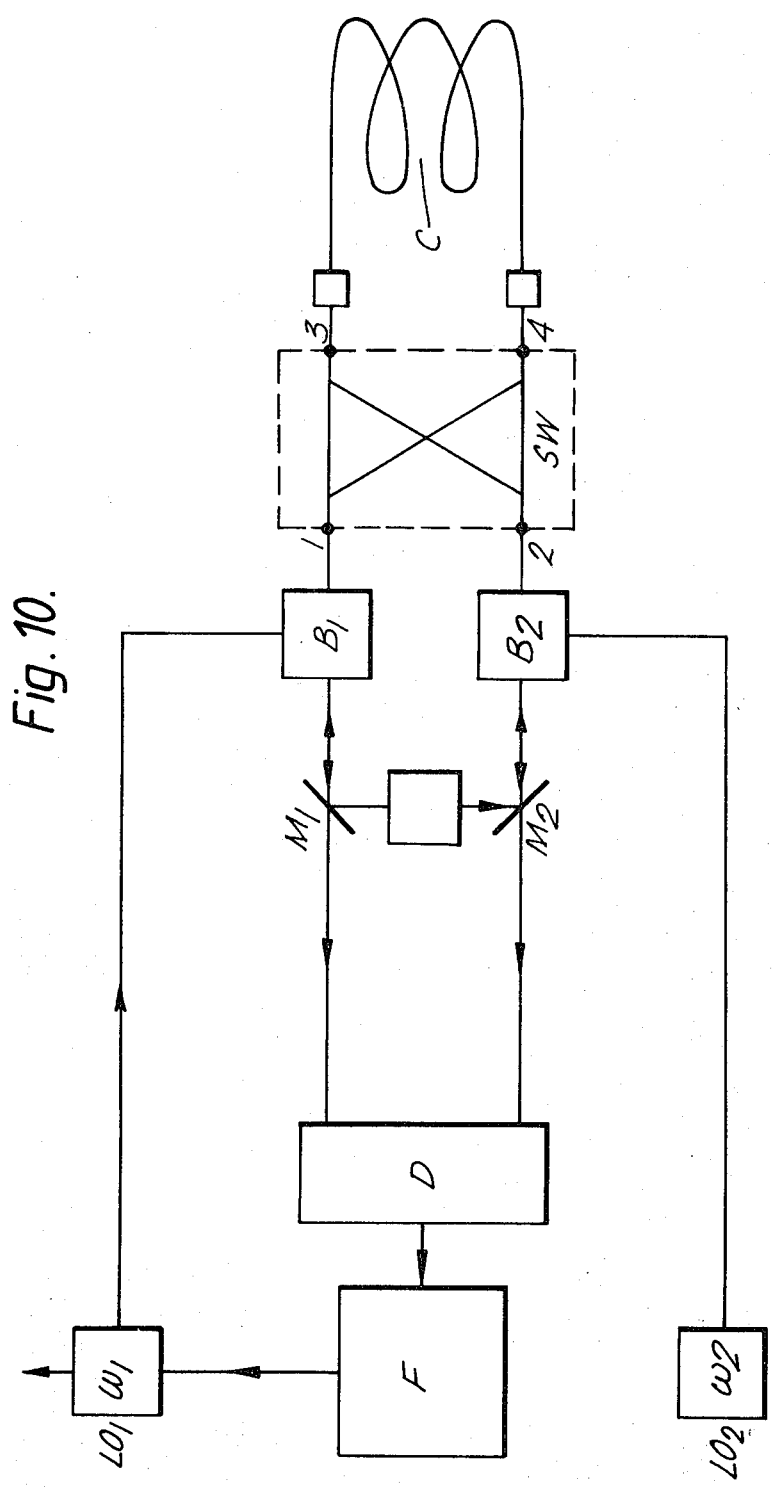

The instruments so far described have involved the direct measurement of phase differences introduced by the Sagnac effect. An alternative approach is to use a phase-nulling effect by introducing a controllable non-reciprocal element into the optical path which is controlled by a feed-back loop so as to balance the Sagnac effect. The non-reciprocal element can be for instance a Faraday cell. FIG. 10 shows an instrument which uses a pair of Bragg cells $B_1$ and $B_2$ as non-reciprocal elements. Light of frequency $\omega_0$ from a laser source S is directed by beam splitting mirrors $M_1$ and $M_2$ through the two Bragg cells $B_1$ and $B_2$ driven respectively by local oscillators $LO_1$ and $LO_2$ operating respectively at frequencies $\omega_1$ and $\omega_2$. The two frequency shifted beams, respectively of frequency $\omega_0 + \omega_1$ and $\omega_0 + \omega_2$, emerging from the Bragg cells are then directed through a commutating switch SW and into opposite ends of an optical fibre Sagnac coil C. The emergent beams, after returning through the commutating switch, and the opposite Bragg cell, are directed through the mirrors $M_1$ and $M_2$ and recombined to produce an interference signal input to a photodetector D. The output of the photodetector provides the input to a feedback control F which regulates the frequency $\omega_1$ of the first local oscillator while that of the second is maintained constant at the frequency $\omega_2$.

If the coil is not rotated about its axis, and the two local oscillators operate at the same frequency, there is a particular phase angle between the two signals of frequency $\omega_0 + 2\omega_2$ received at the photodetector. This is due to the difference in optical path distance in the unbalanced parts of the two paths from source to detector. If the local oscillator frequencies remain unchanged, and now the coil is rotated about its axis at a constant rate, this phase angle will change because the phase of one signal is advanced by the rotation while that of the other is retarded. The phase relationship is however also changed if the frequency of the first local oscillator is changed. This is because light is propagating through the coil at one frequency in one direction, but through it at a different frequency in the opposite direction. The feedback control adjusts the frequency of the first local oscillator so as to maintain a constant phase difference at the photodetector. Operation of the commutating switch reverses the connections to the Sagnac coil so that for a constant rate of rotation the frequency of the first local oscillator is frequency modulated in phase with the switching. As with the instruments of FIGS. 7 and 9, the switching frequency is chosen to be equal to, or a multiple of, the reciprocal of the propagation time of light through the Sagnac coil in order to ensure that light launched into the coil when the switch is in either one of its two conditions emerges from the coil to return through the switch when once again the switch is in the same condition. It should be apparent that while FIG. 10 illustrates a single coil and switch construction corresponding to the FIG. 5 arrangement, the two coil and switch arrangements of FIG. 6 can be substituted for this.

In the above described instruments the switching frequency has been made equal to, or a multiple of, the propagation time of the light through the Sagnac coil so that light entering the coil when the switch is in one position will leave the coil when the switch is again in the same position. However, it should be noted that operation at a lower frequency is in principle possible provided that the switching frequency is made less than the reciprocal of the propagation time. This will involve accepting the penalty of a "dead" time.

We claim:

1. An optical fibre coil Sagnac effect rotation rate measuring instrument which has either a matched pair of optical fibre Sagnac coils, each consisting of a plurality of turns of single mode fibre, arranged to have a common axial direction, wherein the instrument is provided with two optical ports for connection with said pair of coils and is connected thereto via a commutating switch, operation of which changes the interconnection of the ports from one coil to the other in such a way that light previously launched into the one coil to propagate in either one of the two rotational senses is now launched to propagate in the opposite rotational sense in the other coil.

2. An instrument as claimed in claim 1 wherein means is provided to direct beams of light from an optical source through the commutating switch, into both ends of each Sagnac coil in turn, back through the commutating switch and on to a photodetector such that the light beam which has propagated in one sense through the Sagnac coil is interfered at the detector with the light beam that has propagated through the Sagnac coil in the opposite sense, and wherein the means is constructed to provide, in the case of the coil at rest, a difference in optical path length for the two beams providing a phase angle difference at the detector substantially different from 0 and from $\pi$.

3. An instrument as claimed in claim 1 wherein means is provided to direct beams of light from an optical source through the commutating switch into both ends of each Sagnac coil in turn, back through the commutating switch and on to photodetectors, which means also directs other beams of light from the source on to the photodetectors and includes Bragg elasto-optic frequency shifting cells to frequency shift the light of the beams such that the photodetectors produce intermediate frequency heterodyne output signals, and wherein the instrument includes means to measure the phase relationship between said intermediate frequency output.

4. An instrument as claimed in claim 1 wherein means is provided to direct beams of light from an optical source through the commutating switch into both ends of each Sagnac coil in turn, back through the commutating switch and on to a photodetector such that the light beam which has propagated in one sense through the Sagnac coil is interfered at the detector with the light beam that has propagated through the Sagnac coil in the opposite sense, which means includes a controllable optically non-reciprocal element through which one of the beams propagates on its way to the commutating switch and through which the other of the beams propagates on its way to the detector having returned through the commutating switch, and wherein the output of the photodetector is connected to the input of a feedback control circuit adapted to control the controllable non-reciprocal element in such a way as to maintain a constant phase angle between the two beams interfered at the detector, which phase angle is substantially different from 0 and from $\pi$.

5. An instrument as claimed in claim 4 wherein the controllable non-reciprocal element is a Bragg elasto-optic frequency shifting cell.

* * * * *